United States Patent
Pendse et al.

(10) Patent No.: US 12,450,286 B2
(45) Date of Patent: Oct. 21, 2025

(54) VIDEO CAMERA AND METHOD FOR ANALYZING A VIDEO STREAM

(71) Applicant: Axis AB, Lund (SE)

(72) Inventors: Mikael Pendse, Lund (SE); Adam Jalkemo, Lund (SE)

(73) Assignee: Axis AB, Lund (SE)

( * ) Notice: Subject to any disclaimer, the term of this patent is extended or adjusted under 35 U.S.C. 154(b) by 700 days.

(21) Appl. No.: 17/195,723

(22) Filed: Mar. 9, 2021

(65) Prior Publication Data

US 2021/0303623 A1    Sep. 30, 2021

(30) Foreign Application Priority Data

Mar. 24, 2020   (EP) .................................... 20165085

(51) Int. Cl.
| | |
|---|---|
| *G06F 16/74* | (2019.01) |
| *G06V 20/40* | (2022.01) |
| *G06V 40/16* | (2022.01) |

(52) U.S. Cl.
CPC ............ *G06F 16/745* (2019.01); *G06V 20/49* (2022.01); *G06V 40/171* (2022.01)

(58) Field of Classification Search
CPC ..... G06F 16/745; G06V 20/49; G06V 40/171
USPC ........................................................ 715/723
See application file for complete search history.

(56) References Cited

U.S. PATENT DOCUMENTS

| | | | | |
|---|---|---|---|---|
| 9,894,381 B1 * | 2/2018 | Gu | ...................... | H04N 21/8451 |
| 11,803,296 B2 * | 10/2023 | Park | ...................... | G11B 27/031 |
| 12,236,683 B2 * | 2/2025 | Migdal | .................. | G06N 20/00 |
| 2003/0053792 A1 * | 3/2003 | Janevski | .................. | H04N 5/76 |
| | | | | 386/229 |
| 2007/0150138 A1 * | 6/2007 | Plante | .............. | H04N 21/44004 |
| | | | | 701/33.4 |
| 2008/0279425 A1 * | 11/2008 | Tang | ...................... | G06V 40/16 |
| | | | | 382/118 |

(Continued)

FOREIGN PATENT DOCUMENTS

| | | |
|---|---|---|
| CN | 104506934 A | 4/2015 |
| EP | 2453654 A1 | 5/2012 |

(Continued)

OTHER PUBLICATIONS

Extended European Search Report dated Jul. 14, 2020 for European Patent Application No. 20165085.0.

*Primary Examiner* — Toan H Vu

(74) *Attorney, Agent, or Firm* — Volpe Koenig

(57) ABSTRACT

A video camera comprises an image sensor for capturing image data of image frames of a video stream; an image buffer for buffering image; and circuitry. The circuitry executes: a first evaluation function to evaluate a subset of image frames in the video stream by evaluating data pertaining to the subset of image frames and to output a corresponding first evaluation result, wherein the evaluation of an image frame has an evaluation time larger than 1/fps for the video stream; a buffer function to, for each image frame being, mark the image frame as being under evaluation and indicate to the image buffer to buffer image data of the marked image frame; and a second evaluation function to access the image buffer to evaluate image data of each of the subset of image frames based on the corresponding first evaluation result and output a corresponding second evaluation result.

15 Claims, 4 Drawing Sheets

(56) References Cited

U.S. PATENT DOCUMENTS

| | | | |
|---|---|---|---|
| 2009/0074304 A1 | 3/2009 | Momosaki | |
| 2013/0208814 A1* | 8/2013 | Argyropoulos | H04N 21/43072 |
| | | | 375/240.27 |
| 2014/0198196 A1* | 7/2014 | Howard | G06V 40/171 |
| | | | 348/78 |
| 2014/0253804 A1* | 9/2014 | Asukai | H04N 1/00167 |
| | | | 348/584 |
| 2015/0036942 A1* | 2/2015 | Smirnov | G06V 10/7747 |
| | | | 382/227 |
| 2015/0230712 A1* | 8/2015 | Aarabi | A61B 5/0077 |
| | | | 600/476 |
| 2017/0125064 A1* | 5/2017 | Aggarwal | H04N 5/222 |
| 2017/0339417 A1* | 11/2017 | Puri | G06F 18/2178 |
| 2018/0173983 A1* | 6/2018 | Zink | G06N 3/063 |
| 2018/0220189 A1* | 8/2018 | Hodge | G06Q 50/18 |
| 2019/0141919 A1* | 5/2019 | Kundra | G06V 20/188 |
| | | | 348/159 |
| 2022/0012485 A1* | 1/2022 | Petrova | G06V 30/10 |
| 2025/0018245 A1* | 1/2025 | Forsgren | G01S 13/72 |

FOREIGN PATENT DOCUMENTS

| | | |
|---|---|---|
| EP | 2521046 A1 | 11/2012 |
| KR | 10-2017-0119379 A | 10/2017 |

* cited by examiner

VIDEO CAMERA AND METHOD FOR ANALYZING A VIDEO STREAM

TECHNICAL FIELD

The present invention relates to a video camera and a method for analyzing a video stream using a cascade of evaluation functions, and more particularly, image buffer usage during running of video analytics using such a cascade of evaluation functions.

BACKGROUND

Video analytics may be performed using a cascade of evaluation functions. For example, a first evaluation function, Algo1, is dedicated for making a first evaluation, e.g. face detection in a video stream and a second evaluation function, Algo2, is dedicated for making a second evaluation, e.g. a face recognition on the faces detected by Algo1. Typically, the output from Algo1 consists of metadata, e.g. timestamp of the video frame in the video stream where a face was detected and coordinates of the face in the video frame. Algo2 can then identify the video frame in the video stream by using the timestamp and crop the face region(s) from the coordinates given in the metadata and do further analysis, e.g. face recognition. Hence, Algo1 needs to evaluate many frames of video stream but Algo2 is only interested in a subset of the frames which Algo1 has marked as important, in this example marked as containing a detected face.

In order to safeguard that Algo2 can evaluate the image frames marked as important by Algo1 image data pertaining to the image frames up to some age needs to be buffered. This to ensure that Algo2 has access to image data pertaining to the image frames marked as important by Algo1. Typically, the image data pertaining to the image frames needs to be raw image data for various performance reasons. The amount of image data that needs to buffered can become quite large, especially if Algo1 has some latency between the capturing of the image data and the metadata delivery. According to one example, the latency between the capturing of the image data and the metadata delivery is 250 ms and the image data is captured with a rate of 60 frames per second, fps. According to this example, at least 15 (60 fps*0.25 s) full resolution raw images needs to be buffered. In case the latency of Algo1 goes up even more, image data needs to be buffered.

However, the size of the image buffer is often limited, especially, for video cameras, wherein the above-mentioned video analytics typically is performed. Hence, there is a need in developing video analytics comprising a cascade of analytics functions.

SUMMARY

Mitigating, alleviating or eliminating one or more of the above-identified deficiencies in the art and disadvantages singly or in any combination and at least partly solving the above-mentioned problem would be beneficial.

According to a first aspect a video camera is provided. The video camera being configured to analyze a video stream. Especially, the video camera is configured to analyze the video stream using a cascade of evaluation functions. The video camera comprises an image sensor, an image buffer and circuitry. The image sensor is configured to capture image data of image frames of the video stream. The image buffer is configured to buffer image data of image frames. The circuitry is configured to execute a first evaluation function, a buffer function and a second evaluation function. The first evaluation function is configured to evaluate a subset of image frames in the video stream by evaluating data pertaining to the subset of image frames. The first evaluation function is configured to, for each evaluated image frame, output a corresponding first evaluation result. The evaluation of an image frame has an evaluation time larger than 1/fps for the video stream. The buffer function is configured to, for each image frame being evaluated by the first evaluation function, mark the image frame as being under evaluation and indicate to the image buffer to buffer image data of the marked image frame. The second evaluation function is configured to access the image buffer to evaluate image data of each of the subset of image frames based on the corresponding first evaluation result, upon being available. The second evaluation function is configured to output a corresponding second evaluation result.

It is noted that in the cascade of evaluation functions, the first evaluation function has a latency being larger than 1/fps for the video stream and the second evaluation function needs the result from the first evaluation function in order to perform its evaluation. By the insight made by the inventors on how to buffer image data during execution of video analytics, image buffer memory saving may be made. Especially, during execution of video analytics using a cascade of evaluation functions. Indicating which image frames of a video stream the first evaluation function is evaluating allows to only buffer image data of the image frames under evaluation. Hence, memory usage of the image buffer may be saved.

The image buffer may be configured to initially buffer image data of all captured image frames. The buffer function may be configured to, when indicating to the image buffer to buffer image data of a specific image frame of the subset of image frames, instruct the image buffer to delete image data of image frames temporally preceding the specific image frame not marked as being under evaluation.

The buffer function may be configured to instruct the image buffer to delete image data of an image frame corresponding to the outputted second evaluation result.

The data pertaining to a subset of image frames may comprise one or more of: image data of the subset of image frames, and other sensor data temporally corresponding to the subset of image frames.

The video camera may comprise a transceiver configured to receive the other sensor data.

The video camera may comprise one of more sensors configured to capture the other sensor data.

The first evaluation function may comprise one or more of: an object detection function, a motion detection function, a change detection function, and an image segmentation function.

The second evaluation function may comprise one or more of: an object identification function and an object classification function.

The first evaluation result may comprise an identification of a region of the corresponding image data to be evaluated by the second evaluation function.

The buffer function may be configured to mark an image frame of the subset of image frames as being under evaluation by adding data to a header of the image frame.

The buffer function may be configured to mark an image frame of the subset of image frames as being under evaluation by updating a register over image frames being under evaluation by the first evaluation function.

According to a second aspect, a method for analyzing a video stream comprising a plurality of image frames is provided. The method is a video analytics method. The video analytics may be made using a cascade of evaluation functions. The method comprising:

evaluating, by a first evaluation function, a subset of image frames in the video stream by evaluating data pertaining to the subset of image frames and, for each evaluated image frame, outputting a corresponding first evaluation result, wherein the evaluation of an image frame has an evaluation time larger than 1/fps for the video stream;

for each image frame being evaluated by the first evaluation function, marking the image frame as being under evaluation and indicating to an image buffer to buffer image data of the marked image frame;

evaluating, by a second evaluation function configured to access the image buffer, image data of each of the subset of image frames based on the corresponding first evaluation result, upon being available; and outputting a corresponding second evaluation result for each of the subset of image frames.

The method may comprise, by the image buffer, initially buffering image data of all image frames in the video stream upon capturing of the same. The step/act of indicating to the image buffer to buffer image data of a specific image frame of the subset of image frames comprises instructing the image buffer to delete image data of image frames temporally preceding the specific image frame not marked as being under evaluation.

The above-mentioned features of the video camera, when applicable, apply to the method of this second aspect as well. In order to avoid undue repetition, reference is made to the above.

According to a third aspect, a non-transitory computer-readable storage medium is provided. The non-transitory computer-readable storage medium having stored thereon instructions for implementing the method according to the second aspect, when executed on a device having processing capabilities. The device may be a video camera, e.g. the video camera of the first aspect. The device may be a video management server.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the claims are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present teachings will now be described more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and to fully convey the scope of the claims to the skilled person.

Figure 1:
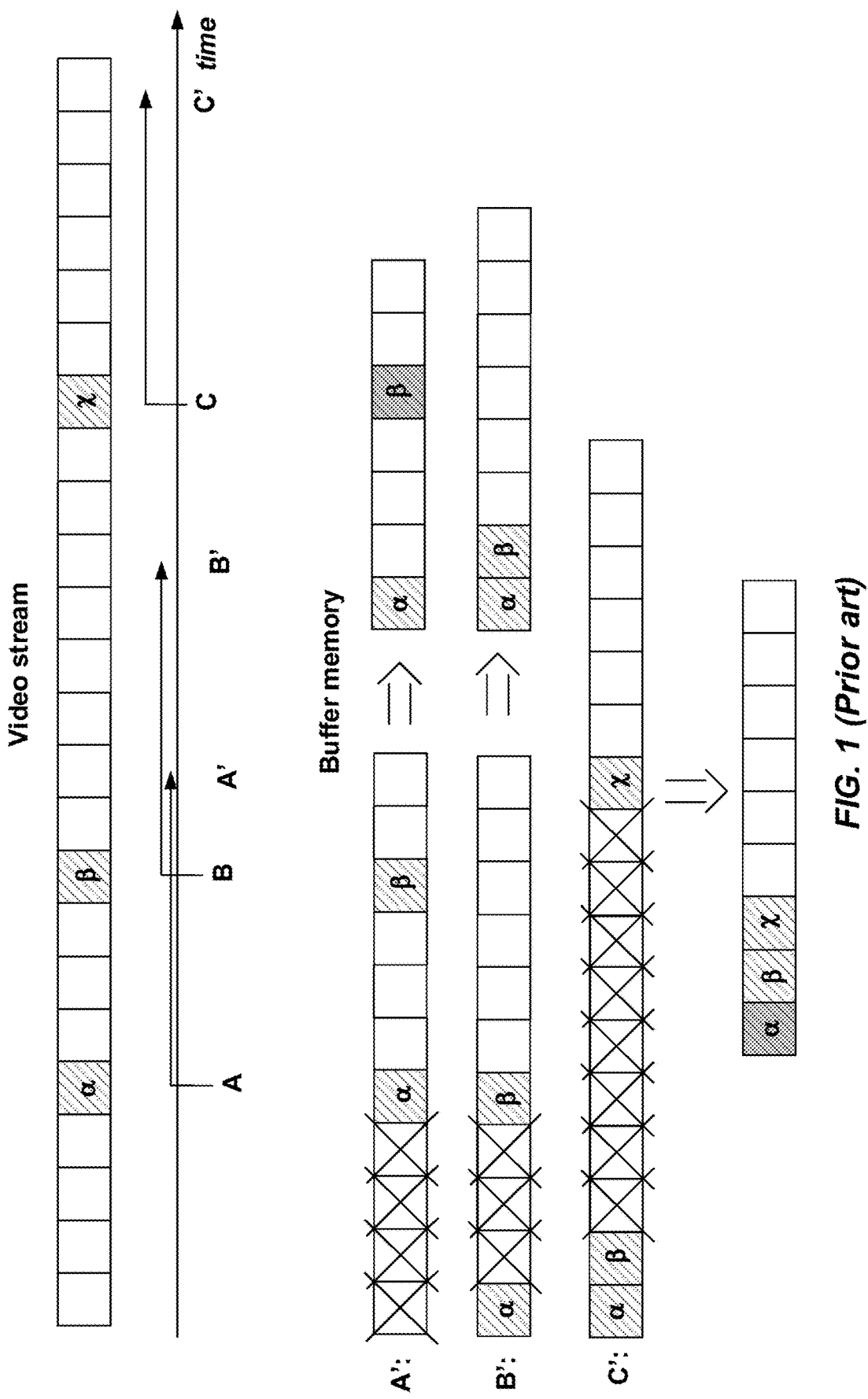
FIG. 1 schematically illustrates latency and image buffer usage for video analytics using a cascade of evaluation functions in accordance with prior art.

In connection with FIG. 1 image buffer usage of for video analytics using a cascade of evaluation functions in accordance with prior art will discussed. As mentioned in the background section, video analytics may be performed using a cascade of evaluation functions. Let us assume that the cascade of evaluation functions comprises a first evaluation function and a second evaluation function. The second evaluation function can only start to be performed once the first evaluation function is ready. Hence, the second evaluation function is dependent on a result from the first evaluation function. In the example that will be discussed in connection with FIG. 1 image frames $\alpha$, $\beta$ and $\chi$ of a video stream are evaluated by a first evaluation function. The evaluation of image frame $\alpha$ starts at time A and the result from the evaluation by the first evaluation function is ready at time A'. The evaluation of image frame $\beta$ starts at time B and the result from the evaluation by the first evaluation function is ready at time B'. The evaluation of image frame $\chi$ starts at time C and the result from the evaluation by the first evaluation function is ready at time C'. This is illustrated in the top portion of FIG. 1 where the video stream is represented by a plurality of sequential image frames arranged along a time line. Image frames $\alpha$, $\beta$ and $\chi$ are marked in the video stream. Further, the different times A, A', B, B', C and C' are marked on the time line. In FIG. 1 the latency of the first evaluation function is equally long for each performed evaluation. Hence, the latencies A-A', B-B' and C-C' are equally long. It is to be noted that the evaluation performed by the first evaluation function has an evaluation time larger than 1/fps for the video stream.

In order to be executed, the second evaluation function needs to have access to image data pertaining to the image frame being evaluated by the first evaluation function and the result from the evaluation performed by the first evaluation function. Typically, the second evaluation function needs to have access to raw image data, or at least uncompressed image data, pertaining to the image frame being evaluated by the first evaluation function. Thus, in order to safeguard that the second evaluation function have access to the image data pertaining to the image frame being evaluated by the first evaluation function, image data pertaining to the image frames up to some age needs to be buffered in an image buffer. This will be elaborated on in the lower portion of FIG. 1. Image data pertaining to the image frames is continuously buffered in the image buffer. In FIG. 1 image buffer usage at times A', B' and C' will be discussed.

Until the time A' image data pertaining to all image frames prior to A' has been continuously buffered in the image buffer. This is illustrated at "A':" in the lower portion of FIG. 1. At time A' the evaluation, by the first evaluation function, of image frame α is completed. All image data pertaining to image frames prior to image frame α may then be discarded, i.e. image data pertaining to image frames prior to time A may be removed from the image buffer. However, all image data pertaining to image frames after time A must still be kept in the image buffer. This since it is still unknown what image data after time A the second evaluation function need to have access to. Hence, all image data pertaining to image frames after time A need to be buffered until a new result from the first evaluation function is ready.

From time A to time B' image data pertaining to the image frames in-between these two times, need to be buffered, this is illustrated at "B':" in the lower portion of FIG. 1. At time B' the evaluation, by the first evaluation function, of image frame β is completed. All image data pertaining to image frames prior to image frame β may then be discarded, i.e. image data pertaining to image frames prior to time B may be removed from the image buffer. This with an exception, the image data pertaining to image frame α may still be needed in the image buffer. This since the second evaluation function may still not be finished evaluating α. However, once the second evaluation function is finished with its evaluation of α, the image data pertaining to image frame α may be removed from the image buffer. Further, all image data pertaining to image frames after time B must still be kept in the image buffer. This since it is still unknown what image data after time B the second evaluation function need to have access to. Hence, all image data pertaining to image frames after time B need to be buffered until a new result from the first evaluation function is ready.

From time B to time C' image data pertaining to the image frames in-between these two times, need to be buffered, this is illustrated at "C':" in the lower portion of FIG. 1. At time C' the evaluation, by the first evaluation function, of image frame χ is completed. All image data pertaining to image frames prior to image frame χ may then be discarded, i.e. image data pertaining to image frames prior to time B may be removed from the image buffer. This with an exception, the image data pertaining to image frames α and β may still be needed in the image buffer. This since the second evaluation function may still not be finished evaluating α and/or β. However, once the second evaluation function is finished with its evaluation of a and/or, the image data pertaining to image frame α and/or β may be removed from the image buffer. Further, all image data pertaining to image frames after time C must still be kept in the image buffer. This since it is still unknown what image data after time C the second evaluation function need to have access to. Hence, all image data pertaining to image frames after time C need to be buffered until a new result from the first evaluation function is ready.

Figure 2:
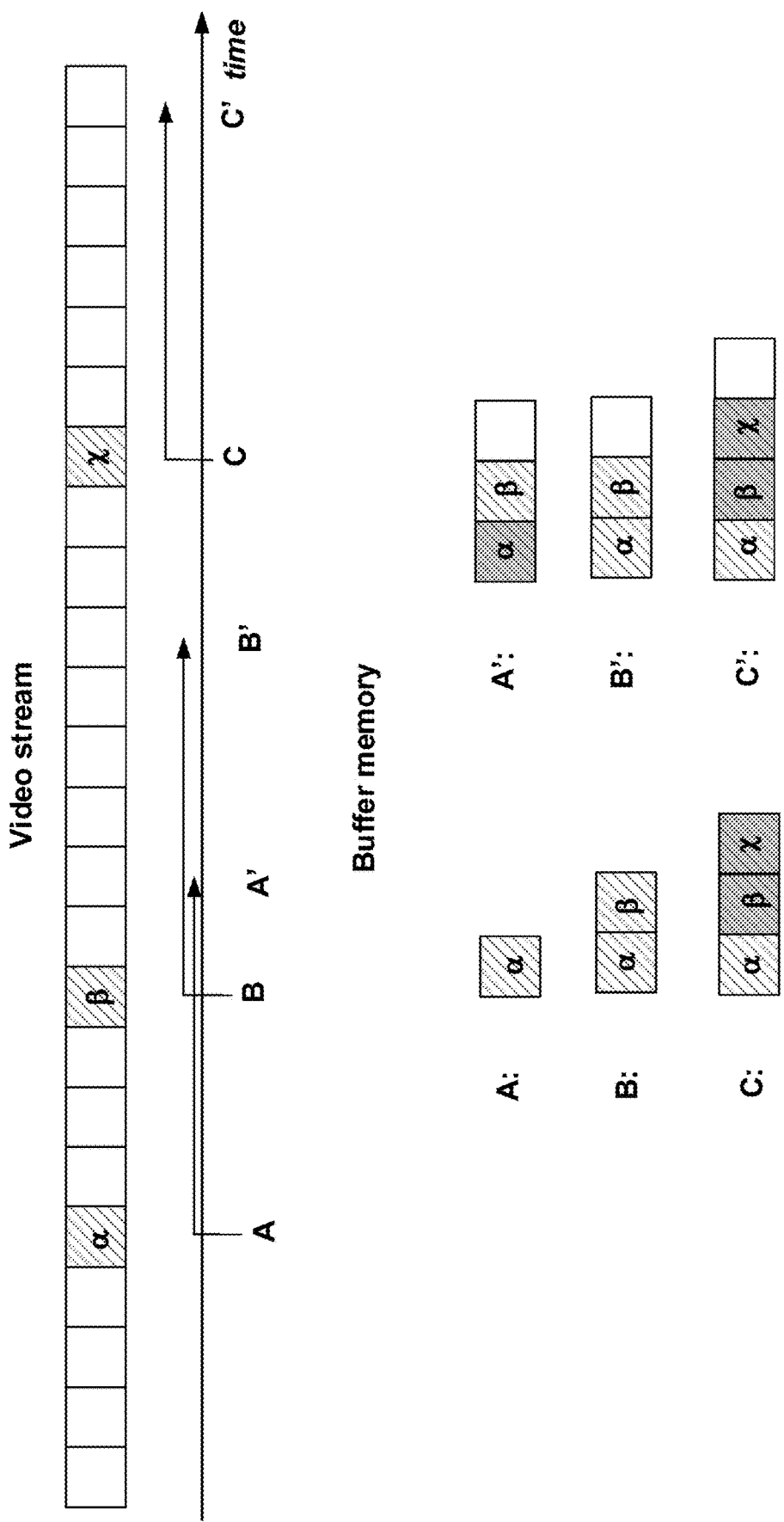
FIG. 2 schematically illustrates latency and image buffer usage for video analytics using a cascade of evaluation functions in accordance with the present invention.

Now turning to FIG. 2. In connection with FIG. 2 image buffer usage of for video analytics using a cascade of evaluation functions in accordance with the present teachings will be described. Again, we assume that the cascade of evaluation functions comprises a first evaluation function and a second evaluation function. The second evaluation function can only start to be performed once the first evaluation function is ready. Hence, the second evaluation function is dependent on a result from the first evaluation function i.e. a first evaluation result outputted from the first evaluation function. Data pertaining to image frames α, β and χ of a video stream are evaluated by a first evaluation function. The data pertaining to image frames α, β and χ of the video stream may be image data pertaining to the respective image frame α, β and χ. Such image data may be raw image data, or at least uncompressed image data. Alternatively, or in combination the data pertaining to image frames α, β and χ may be data from another type of sensor. Such data will from now on be referred to as sensor data. Examples of sensors that may be used to generate such sensor data are a RADAR sensor, a LIDAR sensor a PIR sensor and/or a microphone. The data pertaining to image frames analyzed by the first evaluation function is captured at the same time as the image data of the respective image frame. Hence, the data evaluated by the first evaluation function is temporally correlated to the image data of the respective image frame. Hence, the data evaluated by the first evaluation function may be the same image data evaluated by the second evaluation function. Alternatively, or in combination, the data evaluated by the first evaluation function may be other sensor data. The other sensor data is typically temporally correlated to the image data to be evaluated by the second evaluation function.

The evaluation, by the first evaluation function, of data pertaining to image frame α starts at time A and the result from the evaluation is ready at time A'. The evaluation, by the first evaluation function, of data pertaining to image frame β starts at time B and the result from the evaluation is ready at time B'. The evaluation, by the first evaluation function, of data pertaining to the image frame χ starts at time C and the result from the evaluation is ready at time C'. This is illustrated in the top portion of FIG. 2 where the video stream is represented by a plurality of sequential image frames arranged along a time line. Image frames α, β and χ are marked in the video stream. Further, the different times A, A', B, B', C and C' are marked on the time line.

In FIG. 2 the latency of the first evaluation function is equally long for each performed evaluation. Hence, the latencies A-A', B-B' and C-C' are equally long. It is however, noted that the latency for first evaluation function may vary. A variation in latency for the first evaluation function may e.g. vary due to a composition of input data to the first evaluation function. It is to be noted that the evaluation performed by the first evaluation function has an evaluation time larger than 1/fps for the video stream.

Figure 3:
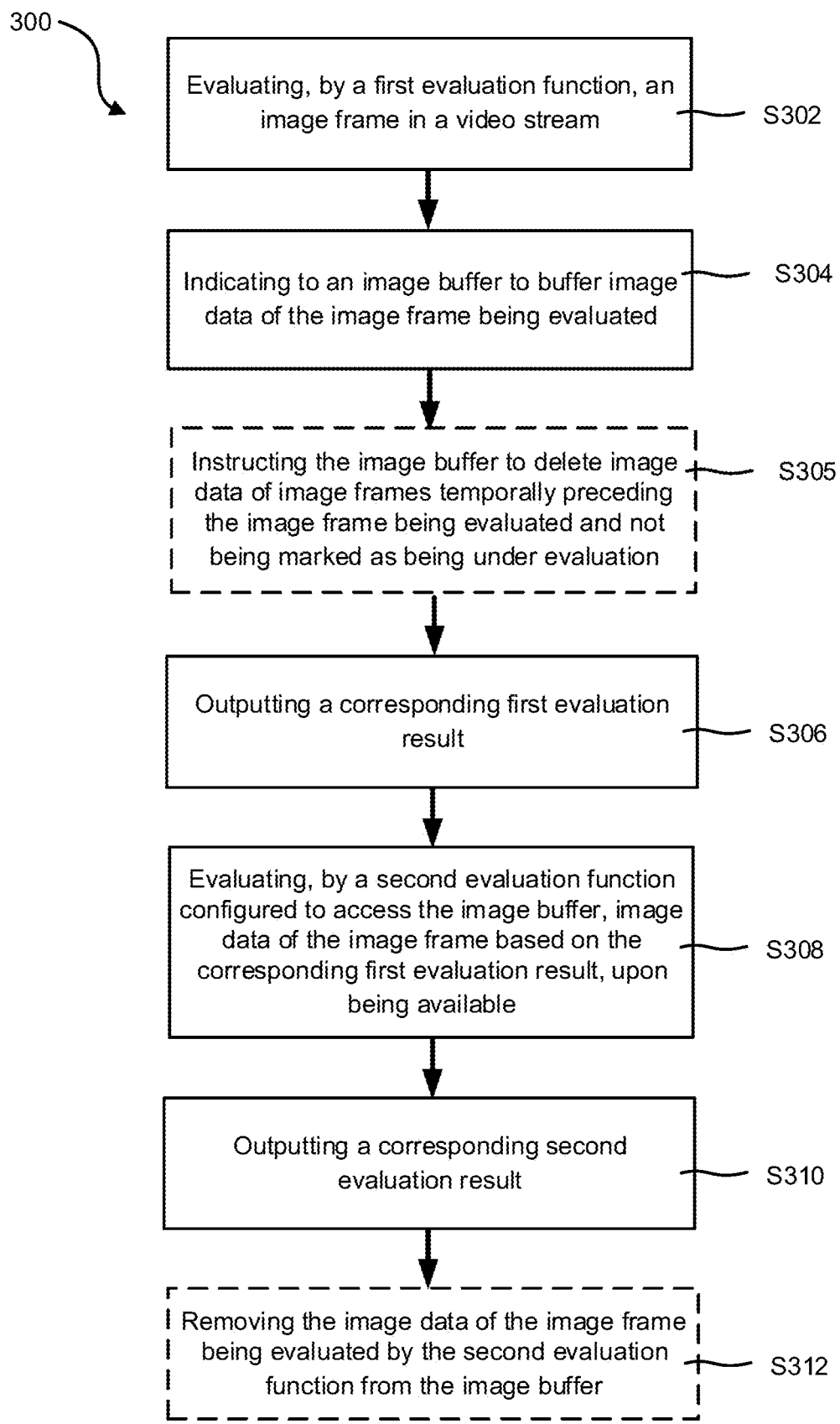
FIG. 3 is a block scheme of a method for analyzing a video stream comprising a plurality of image frames.

With reference to FIG. 3, which is a block scheme of a method 300 for analyzing a video stream comprising a plurality of image frames will initially be discussed. The method comprises evaluating S302, by the first evaluation function, a subset of image frames in the video stream. Wherein the first evaluation function is configured to evaluate a subset of image frames in the video stream. The evaluation made by the first evaluation function is performed by evaluating data pertaining to the subset of image frames. The data pertaining to the subset of image frames may be image data of the respective image frame. The data pertaining to the subset of image frames may be sensor data temporally correlated to the respective image frame. The sensor data may e.g. be generated by a RADAR sensor, a LIDAR sensor a PIR sensor and/or a microphone. Upon completion of evaluating S302, data pertaining to an image frame in the video stream, outputting S306 a corresponding first evaluation result. Hence, the first evaluation function is configured to, for each evaluated image frame, output a corresponding first evaluation result. The evaluation of data pertaining to an image frame performed by the first evaluation function has an evaluation time larger than 1/fps for the video stream.

Just as for the prior art scheme for image buffer usage, the second evaluation function according to the present scheme need to have access to image data pertaining to the image frame being evaluated by the first evaluation function and the first evaluation result from the evaluation performed by the first evaluation function in order to be executed. Typically, the second evaluation function needs to have access to raw image data, or at least uncompressed image data, pertaining to the image frame being evaluated by the first evaluation function. Hence, image data pertaining to the image frame being evaluated by the first evaluation function need to be buffered in the image buffer. Returning to FIG. 3, this is made by, for each image frame being evaluated by the first evaluation function, marking the image frame as being under evaluation and indicating S304 to the image buffer to buffer image data of the marked image frame.

Further, the image buffer may be configured to initially buffer image data of all image frames in the video stream upon capturing of the same. Upon doing so the step/act of indicating S304 to the image buffer to buffer image data of a specific image frame of the subset of image frames comprises instructing the image buffer to delete image data of image frames temporally preceding the specific image frame not marked as being under evaluation.

Hence, the image buffer is instructed to "only" buffer the image data corresponding to the image frames being evaluated by the first evaluation function. This is illustrated in the lower portion of FIG. 2. At the start of an evaluation by the first evaluation function, the image buffer is instructed to buffer image data belonging to the image frame being under evaluation. Hence, at time A the image buffer is instructed to buffer image data belonging to image frame α. At time B the image buffer is instructed to buffer image data belonging to image frame β. At time C the image buffer is instructed to buffer image data belonging to image frame χ. This is illustrated in the lower left portion of FIG. 2. It is to be noted that at time A image data of image frame χ is buffered. However, at time B image data of both image frames α and β is buffered. This since the second evaluation function may still not be finished evaluating χ. Further, at time C image data of image frames α, β and χ is buffered. This since the second evaluation function may still not be finished evaluating α and/or β. However, once the second evaluation function is finished with its evaluation of the image data pertaining to an image frame such image data may be removed from the image buffer.

As is illustrated in the lower right portion of FIG. 2 at time A' the image buffer may hold image data of one additional image frame, namely the image frame captured at time A'. This since, the image buffer may be configured to initially buffer image data of all image frames in the video stream upon capturing of the same. However, upon doing so the step/act of indicating S304 to the image buffer to buffer image data of a specific image frame of the subset of image frames comprises instructing the image buffer to delete image data of image frames temporally preceding the specific image frame not marked as being under evaluation. Consequently, at time B' the image buffer will hold image data of one additional image frame, namely the image frame captured at time B', and at time C' the image buffer will hold image data of one additional image frame, namely the image frame captured at time C'. It is noted that the amount of image data needed to be buffered is substantially reduced as compared with the prior art scheme illustrated in connection with FIG. 1.

Again, returning to FIG. 3 evaluating S308 image data of each of the subset of image frames evaluated by the first evaluation function and buffered in the image buffer is made by the second evaluation function. Hence, the second evaluation function is configured to access the image buffer to evaluate image data of each of the subset of image frames based on the corresponding first evaluation result, upon being available. Upon the second evaluation function is ready evaluation image data of an image frame it may further be configured to output S310 the result as a corresponding second evaluation result.

The method 300 may further comprise, upon outputting S310 a second evaluation result removing S312 the image data of the image frame being evaluated by the second evaluation function from the image buffer.

Figure 4:
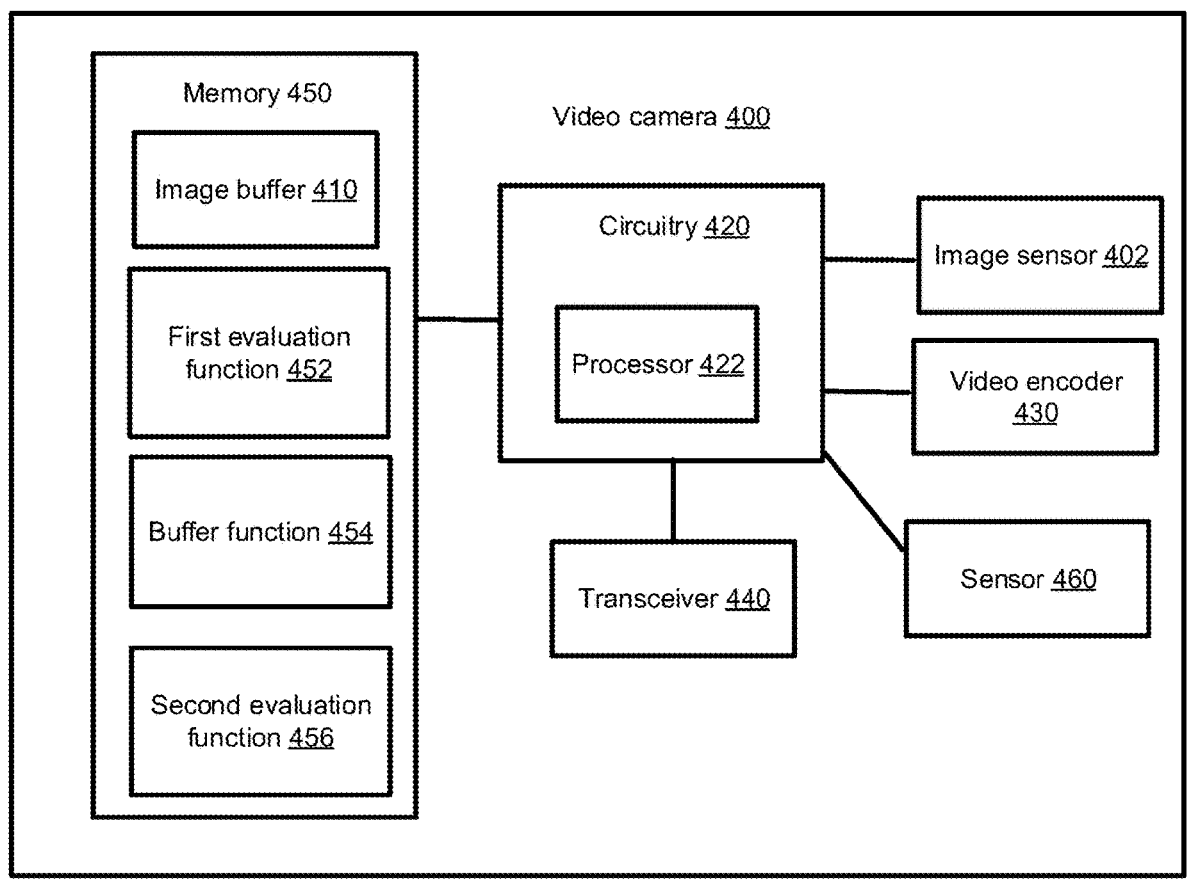
FIG. 4 schematically illustrates a video camera configured to perform video analytics using a cascade of evaluation functions.

In connection with FIG. 4 a video camera 400 configured to perform the cascade video analytics discussed in connection with FIGS. 2 and 3 above will be discussed. Hence, the video camera 400 is configured to analyze a video stream captured by the same. The video camera 400 may be a monitoring camera. The video camera 400 may be stationary.

The video camera 400 may be a video camera being mounted on a moving object, such as a vehicle. The video camera 400 may be worn by a person. The video camera 400 comprises an image sensor 402, an image buffer 410 and circuitry 420.

The image sensor 402 is configured to capture image data of image frames of the video stream. Image sensors and capturing of image data is well known for the person skilled in the art and will not be discussed in any more detail in this disclosure.

The image buffer 410 is configured to buffer image data of image frames. The image buffer 410 is typically a region or portion of a physical memory storage used to temporarily store image data while it is being processed. Typically, the image data is stored in the image buffer 410 as it is captured by the image sensor 402. However, the image buffer 410 may be used when moving image data between functions. The image buffer 410 may be implemented in a fixed memory location in hardware or by using a virtual data buffer in software, pointing at a location in the physical memory storage. In all cases, the image data stored in the image buffer 410 is stored on a physical storage medium. The image buffer 410 may be implemented in software, which typically use a random-access memory, RAM, to temporary store the image data. Using RAM may be beneficial due to the much faster access time compared with hard disk drives. Image buffers are typically used when there is a difference between the rate at which image data is received and the rate at which it can be processed.

The video camera 400 may further comprise one or more of a video encoder 430, a transceiver 440 and a memory 450.

The video encoder 430 is configured to encode image data of image frames captured by the image sensor 402 into an encoded video stream. The video encoder 430 is configured to encode some of the images of the video stream as key frames. A key frame is an encoded video frame that does not require information from other encoded video frames to be decoded. Hence, a key frame is encoded based on information from the image of the video data it is set to correspond to. Typically, similarities within the image is used to encode the image into a key frame. In video encoding a key frame is also known as an intra frame, often referred to as an I-frame. The video encoder 430 is further configured to encode the images of the video stream in between two key frames as delta frames. Typically, a delta frame only comprises changes that occur from one frame to the next. Hence, delta frames are typically comprising less data than key frames. In video encoding a delta frame is also known as an inter frame, often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

The transceiver 440 is configured to receive and/or send information to and/or from the video camera 400. The transceiver 440 may be configured to send out an encoded version of the video stream. However, the transceiver 440 may be configured to receive and/or transmit other information/data as well. For example, the transceiver 440 may be configured to receive sensor data from sensors. Example of sensors are, a LASER sensor, a LIDAR, sensor, a PIR sensor, and a microphone.

The memory 450 may be one or more of a buffer, a flash memory, a hard drive, a removable media, a volatile memory, a non-volatile memory, a random access memory (RAM), or another suitable device. For example, the memory 450 may comprise the image buffer 410. In a typical arrangement, the memory 450 may include a non-volatile memory for long term data storage and a volatile memory that functions as system memory for the circuitry 420. The memory 450 may exchange data with the circuitry 420 over a data bus. Accompanying control lines and an address bus between the memory 450 and the circuitry 420 also may be present. The memory 450 may further be configured to store an encoded version of the video stream and/or meta data generated by the video camera 400.

The circuitry 420 is configured to carry out overall functions of the video camera 400. The circuitry 420 may include a processor 422, such as a central processing unit (CPU), microcontroller, or microprocessor. The processor 422 is configured to execute program code stored in the memory 450, in order to carry out functions of the video camera 400.

Functions of the video camera 400 may be embodied in the form of executable logic routines (e.g., lines of code, software programs, etc.) that are stored on a non-transitory computer readable medium (e.g., the memory 450) of the video camera 400 and are executed by the circuitry 420 (e.g., using the processor 422). Furthermore, the functions of the video server 400 may be a stand-alone software application or form a part of a software application that carries out additional tasks related to the video camera 400. The described functions may be considered a method that the corresponding device is configured to carry out. Also, while the described functions may be implemented in software, such functionality may as well be carried out via dedicated hardware or firmware, or some combination of hardware, firmware and/or software.

The circuitry 420 is configured to execute a first evaluation function 452, a buffer function 454 and a second evaluation function 456.

The first evaluation function 452 is configured to evaluate a subset of image frames in the video stream. This by evaluating data pertaining to the subset of image frames. The data pertaining to an image frame in the subset of image frames may be image data of the particular image frame. However, alternatively, or in combination, the data pertaining to an image frame in the subset of image frames may be sensor data. The sensor data may be generated by any type of sensor. Examples of sensors that may be used to generate such sensor data are a RADAR sensor, a LIDAR sensor a PIR sensor and/or a microphone. The sensor may be external from the video camera 400. In such case the transceiver 440 may be configured to receive the other sensor data. Alternatively, or in combination, the sensor may be comprised in the video camera 400, the video camera may comprise one or more sensors 460. In such case the sensor 460 of the video camera 400 may be configured to generate the sensor data.

The data pertaining to an image frame analyzed by the first evaluation function 452 is captured at the same time as the image data of the respective image frame. Hence, the data evaluated by the first evaluation function 452 is temporally correlated to the image data of the respective image frame. Hence, the data evaluated by the first evaluation function 452 may be the same image data that will be later evaluated by the second evaluation function 456. Alternatively, or in combination, the data evaluated by the first evaluation function 452 may be other sensor data. The other sensor data is typically temporally correlated to the image data to be evaluated by the second evaluation function 456. The evaluation of an image frame has an evaluation time larger than 1/fps for the video stream. According to a non-limiting example, the evaluation time is 250 ms and the video stream is captured at 60 fps. According to this example at least 15 (60 fps*0.25 s) image frame will be generated while the evaluation of the first evaluation function is executed once.

The first evaluation function 452 is further configured to, for each evaluated image frame, output a corresponding first evaluation result. The first evaluation result may comprise an identification of a region of the corresponding image data to be evaluated by the second evaluation function 456.

The first evaluation function 452 may comprise one or more of: an object detection function, a motion detection function, a change detection function, and an image segmentation function.

The buffer function 454 is configured to, for each image frame being evaluated by the first evaluation function 452, mark the image frame as being under evaluation and indicate to the image buffer 410 to buffer image data of the marked image frame. The image buffer 410 may be configured to initially buffer image data of all captured image frames. The buffer function 454 may be configured to, when indicating to the image buffer 410 to buffer image data of a specific image frame of the subset of image frames, to instruct the image buffer 410 to delete image data of image frames temporally preceding the specific image frame not marked as being under evaluation. The buffer function 454 may be configured to mark an image frame of the subset of image frames as being under evaluation by adding data to a header of the image frame. Alternatively, or in combination, the buffer function 454 may be configured to mark an image frame of the subset of image frames as being under evaluation by updating a register over image frames being under evaluation by the first evaluation function 452.

The second evaluation function 456 is configured to access the image buffer 410 to evaluate image data of an image frame being evaluated by the first evaluation function 452 based on the corresponding first evaluation result, upon on the corresponding first evaluation result being available. The second evaluation function 456 is further configured to output a corresponding second evaluation result. The second evaluation function 456 may comprises one or more of: an object identification function and an object classification function.

The buffer function 454 may be configured to instruct the image buffer 410 to delete image data of an image frame corresponding to the outputted second evaluation result.

The person skilled in the art realizes that the present description and claims are by no means limited to the preferred embodiments described above. On the contrary, many modifications and variations are possible within the scope of the appended claims.

For example, the method discussed in connection with FIGS. 2 and 3 may be performed in a video management server. The video management server may be implemented as a single server device or it may be implemented as a distributed server being distributed over many different devices. The video managing server may comprise an image buffer and a circuitry similar to the image buffer and a circuitry discussed in connection with the video camera 400.

It is also to be noted that in FIG. 2 the evaluations made by the first evaluation function is non-periodic. However, for some applications the evaluations made by the first evaluation function may be periodic.

Additionally, variations to the disclosed embodiments can be understood and effected by the skilled person in practicing the claims, from a study of the drawings, the disclosure, and the appended claims.

The invention claimed is:

1. A video camera for analyzing a video stream, the video camera comprising:
 an image sensor configured to capture image data of image frames of the video stream;
 an image buffer configured to buffer image data of the image frames; and
 circuitry configured to:
  receive first sensor data from a sensor, wherein the sensor is at least one of a RADAR sensor, a LIDAR sensor a PIR sensor and/or a microphone,
  perform a first evaluation on a subset of the image frames in the video stream by temporally correlating the first sensor data with the subset of the image frames in the video stream, wherein the first evaluation generates a corresponding first evaluation result and has an evaluation time larger than 1/fps for the video stream;
  for each image frame in the subset, mark the image frame as being under evaluation to form marked image frames,
  delete image frames temporally preceding the marked image frames from the image buffer,
  selectively perform a second evaluation on the image data of each of the image frames in the subset based on the corresponding first evaluation result, wherein the second evaluation generates a corresponding second evaluation result,
  delete the marked image frames from the image buffer in response to outputting the corresponding second evaluation result.

2. The video camera according to claim 1, wherein the sensor is external to the video camera.

3. The video camera according to claim 1, wherein the sensor is integrally formed with the video camera.

4. The video camera according to claim 1, wherein the first evaluation comprises one or more of: an object detection function, a motion detection function, a change detection function, and an image segmentation function.

5. The video camera according to claim 1, wherein the second evaluation comprises one or more of: an object identification function and an object classification function.

6. The video camera according to claim 1, wherein the corresponding first evaluation result comprises an identification of a region of the image data to be evaluated by the second evaluation.

7. The video camera according to claim 1, wherein the marked image frames are marked by adding data to a header of the marked image frames.

8. The video camera according to claim 1, wherein the marked image frames are marked by updating a register.

9. A method for analyzing a video stream, the method comprising:
 capturing the video stream, wherein the video stream comprises image data from a plurality of image frames;
 storing the image data from the plurality of image frames in an image buffer;
 receiving first sensor data from a sensor, wherein the sensor is at least one of a RADAR sensor, a LIDAR sensor a PIR sensor and/or a microphone,
 performing a first evaluation on a subset of the plurality of image frames by temporally correlating the first sensor data with the subset of the image frames in the video stream wherein the first evaluation generates a corresponding first evaluation result and has an evaluation time larger than 1/fps for the video stream;
 for each image frame in the subset, marking the image frame as being under evaluation to form marked image frames;
 deleting, from the image buffer, one or more image frames among the plurality of images frames that temporally proceed the marked image frames;
 selectively performing a second evaluation on the image data of each of the image frames in the subset based on the corresponding first evaluation result, wherein the second evaluation generates a corresponding second evaluation result;
 outputting the corresponding second evaluation result; and
 deleting the marked image frames from the image buffer in response to the outputting.

10. A non-transitory computer-readable storage medium having stored thereon instructions for analyzing a video stream, the instruction when executed by a processor cause the processor to perform a method comprising:
 capturing the video stream, wherein the video stream comprises image data from a plurality of image frames;
 storing the image data from the plurality of image frames in an image buffer;
 receiving first sensor data from a sensor, wherein the sensor is at least one of a RADAR sensor, a LIDAR sensor a PIR sensor and/or a microphone,
 performing a first evaluation on a subset of the plurality of image frames by temporally correlating the first sensor data with the subset of the image frames in the video stream wherein the first evaluation generates a corresponding first evaluation result and has an evaluation time larger than 1/fps for the video stream;
 for each image frame in the subset, marking the image frame as being under evaluation to form marked image frames;
 deleting, from the image buffer, one or more image frames among the plurality of images frames that temporally proceed the marked image frames;
 selectively performing a second evaluation on the image data of each of the image frames in the subset based on the corresponding first evaluation result, wherein the second evaluation generates a corresponding second evaluation result;

outputting the corresponding second evaluation result; and deleting the marked image frames from the image buffer in response to the outputting.

11. The video camera of claim 1, wherein the sensor is the RADAR sensor.

12. The video camera of claim 1, wherein the sensor is the LIDAR sensor.

13. The video camera of claim 1, wherein the sensor is the PIR sensor.

14. The video camera of claim 1, wherein the sensor is the microphone.

15. The video camera of claim 1, wherein the circuitry includes a processor that is configured by executing program code stored in a memory.

* * * * *